United States Patent

Kume et al.

Patent Number: 5,385,321
Date of Patent: Jan. 31, 1995

[54] BELT CLAMP

[75] Inventors: Kiyotaka Kume, Aichi; Takuya Tanaka, Mie, both of Japan

[73] Assignees: Sumitomo Wiring Systems, Ltd., Yokkaichi; Daiwa Kasei Industry Co., Ltd., Okazaki, both of Japan

[21] Appl. No.: 16,926

[22] Filed: Feb. 12, 1993

[30] Foreign Application Priority Data

Mar. 5, 1992 [JP] Japan .............................. 4-020736[U]

[51] Int. Cl.⁶ .............................................. F16L 3/08
[52] U.S. Cl. .............................. 248/74.3; 24/16 PB; 248/68.1
[58] Field of Search .................. 248/68.1, 69, 74.1, 248/74.3; 24/16 PB, 17 AP, 453

[56] References Cited

U.S. PATENT DOCUMENTS

| | | | |
|---|---|---|---|
| 3,049,771 | 8/1962 | Litwin et al. | 248/74.3 X |
| 3,463,427 | 8/1969 | Fisher | 248/743 X |
| 3,816,878 | 6/1974 | Fulton et al. | |
| 4,447,934 | 5/1984 | Anscher | 248/74.3 X |
| 4,516,293 | 5/1985 | Beran | 24/16 PB |
| 4,735,387 | 4/1988 | Hirano et al. | 248/74.3 X |
| 4,944,475 | 7/1990 | Ono et al. | 248/74.3 X |
| 5,131,613 | 7/1992 | Kamiya et al. | 248/74.3 |
| 5,224,244 | 7/1993 | Ikeda et al. | 248/74.3 X |

FOREIGN PATENT DOCUMENTS

| | | |
|---|---|---|
| 383231 | 6/1987 | Australia . |
| 1775420 | 11/1971 | Germany . |
| 1775342 | 1/1973 | Germany . |
| 59-136009 | 9/1984 | Japan . |
| 1079888 | 8/1967 | United Kingdom . |
| 1314978 | 4/1973 | United Kingdom . |

Primary Examiner—Ramon O. Ramirez
Assistant Examiner—Derek J. Berger
Attorney, Agent, or Firm—Sughrue, Mion, Zinn, Macpeak & Seas

[57] ABSTRACT

A belt clamp includes a belt portion 10 and a buckle portion 20. The belt portion 10 is provided with a series of cogs 12 on the rear side along the longitudinal direction. The buckle portion 20 is provided with a tongue piece 30 having a through hole 22 adapted to permit said belt portion 10 to pass therethrough and pawls 32 adapted to engage with the cogs 12. The tongue piece 30 is formed on an end of a base plate 24 formed on the buckle portion so that only the pawls 32 project on the interior of the through hole 22. Thus, the distance between a wire harness after bundling and the top face of a panel becomes small, and the belt clamp requires a small mounting space and causes little backlash.

1 Claim, 2 Drawing Sheets

Fig. 3
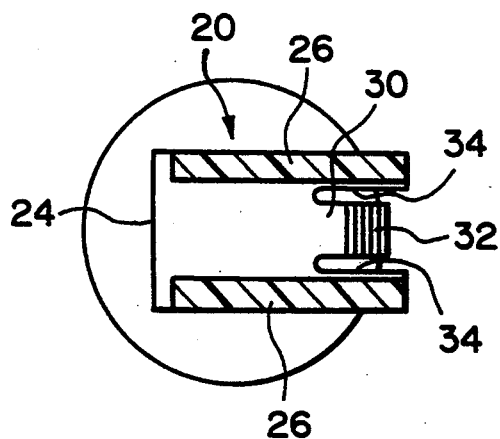
Fig. 4
Fig. 5
PRIOR ART
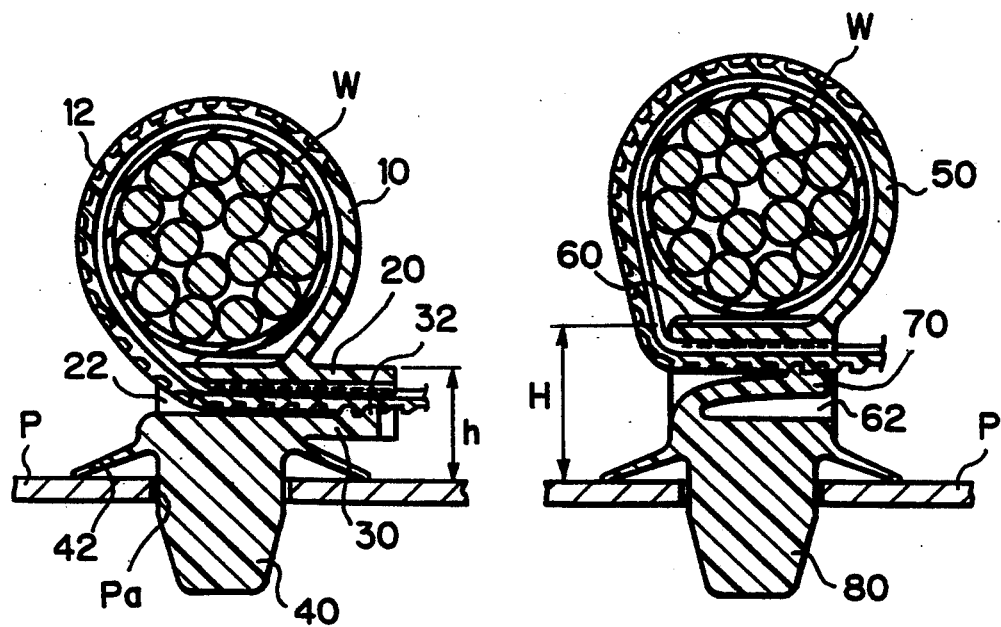

BELT CLAMP

BACKGROUND OF THE INVENTION

1. Field of the Invention

This invention relates to a belt clamp to be used to hold a wire harness in a bundled position.

2. Statement of the Prior Art

This kind of belt clamp is disclosed in, for example, Japanese Utility Model Public Disclosure No. 59-136009 (1984). The disclosed belt clamp includes a belt portion and a buckle portion. The buckle portion is provided with a tongue piece having a through hole adapted to permit the belt portion to pass therethrough and pawls adapted to engage with a series of cogs on the belt portion.

For convenience of explanation, a construction of a conventional belt clamp is described below by referring to FIG. 5. FIG. 5 is a cross-sectional view of the prior belt clamp which bundles a wire harness. The belt clamp shown in FIG. 5 is the same type of belt clamp disclosed in the above Disclosure. It will be apparent from the drawing that the tongue piece 70 of the buckle portion 60 projects flexibly in a through hole 62. Accordingly, the height of the through hole 62 is set as the total amount of the height of the tongue piece 70 prior to being bent and tile thickness of the belt portion.

In the belt clamp described above, the height H of the buckle portion 60 inevitably becomes great in order to assure sufficient size of the through hole 62. Consequently, if the buckle portion 60 is attached to a mounting panel P by a lock leg 80 formed integrally on the buckle portion, a wire harness W which is bundled by the belt portion 50 and the buckle portion 60 is spaced far away from the top face of the mounting panel P.

This necessitates a large space for attaching the wire harness W by the belt clamp to the mounting panel P and causes a backlash of the wire harness W in the belt clamp. The backlash causes a noise or an abnormal sound.

SUMMARY OF THE INVENTION

An object of the present invention is to provide a belt clamp which brings a bundled wire harness close to a mounting panel by making the height of the buckle portion small even if the buckle portion is attached to the mounting panel by a lock leg.

In order to achieve the above object, a belt clamp of the present invention includes a belt portion and a buckle portion. The belt portion is provided with a series of cogs on the rear side along the longitudinal direction. The buckle portion is provided with a tongue piece having a through hole adapted to permit said belt portion to pass therethrough and pawls adapted to engage with said cogs. The tongue piece is formed on an end of a base plate formed on said buckle portion so that only said pawls project on the interior of said through hole.

According to the above construction the height of the through hole or the height of the buckle portion itself becomes small since only the pawls of the tongue piece project in the through hole in the buckle portion. Accordingly, the distance between the wire harness which is bundled by the belt portion and the buckle portion and, for example, the top face of a mounting panel to which the buckle portion is attached, becomes small. This makes the space for mounting the wire harness small and causes little backlash of the wire harness in the belt clamp.

BRIEF DESCRIPTION OF THE DRAWINGS

FIG. 3 is a cross-sectional view taken along lines III—III in FIG. 1;

FIG. 4 is a cross-sectional view of a prior belt clamp of the present invention, which bundles the wire harness; and FIG. 5 is a cross-sectional view of a prior belt clamp which bundles the wire harness.

DETAILED DESCRIPTION OF THE PREFERRED EMBODIMENT

Figure 1:
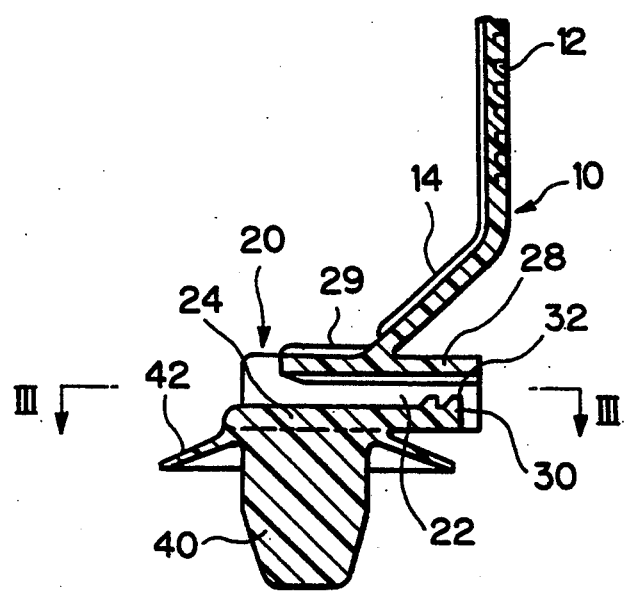
FIG. 1 is a cross-sectional view of a part of a belt clamp of the present invention.

An embodiment of a belt clamp in accordance with the present invention will be described below by referring to the drawings.

Figure 2:
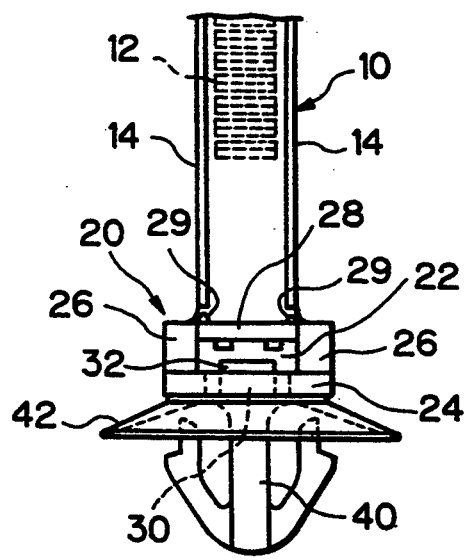
FIG. 2 is a left side view of FIG. 1.

As shown in FIGS. 1 and 2, the belt clamp comprises a belt portion 10 and a buckle portion 20. The base of the belt portion 10 is integrally coupled to an upper plate 28 of the buckle portion 20.

The belt portion is provided with a series of pawls 12 along the longitudinal direction on one side (top side) of the belt portion 10. Ribs 14 and 29 are formed on the other side (bottom side) of the belt portion 10 and on the top face of the upper plate 28 on the buckle portion 20 so that the ribs prevent the wire harness W from slipping in the belt clamp when bundling the wire harness as described above. The buckle portion 20 has a base plate, opposite side plates 26, and an upper plate 28. The buckle portion 20 is provided with a thorough hole 22 adapted to permit the belt portion 10 to pass therethrough. The base plate 24 is provided with a lock leg 40 and a stabilizer 42 such as dish-like spring on the bottom surface.

In FIG. 3, the buckle portion 20 is provided with a tongue piece 30 at an end of the base plate 24 or an exit end of the through hole 22 by forming slits 34 in the base plate 24 along the opposite side plates 26. The tongue piece 30 is provided on the top face with pawls 32 adapted to engage with the cogs 12 of the belt portion 10. The tongue piece 30 permits only the pawls 32 to project in the through hole 22, thereby setting the height of the through hole 22 at the same size as the thickness of the belt portion 10.

An operation of using the belt clamp will be explained below. First, the wire harness W is mounted on the rib 29 on the upper plate 28 of the buckle portion 20. Second, the top end of the belt portion 10 is passed through the through hole 22 so that the belt portion 10 fastens the wire harness W. Then, the rib 14 on the belt portion 10 contacts with the outer periphery of the wire harness W to bundle the wire harness W. Third, a part of the cogs 12 on the belt portion 10 engage with the pawls 32 on the tongue piece 30 so that the belt portion 10 fastens the wire harness W.

FIG. 4 shows that the belt clamp bundles the wire harness W. As shown in FIG. 4, the belt clamp is attached to the mounting panel P by inserting the lock leg 40 into a bore Pa in the panel P after bundling the wire harness W. Then, the distance h between the wire harness W and the top face of the mounting panel P becomes smaller than the distance H shown in FIG. 5, since the height of the through hole 22 is lower than that of the hole in FIG. 5.

According to the present invention, even if the belt clamp has a construction in which the buckle portion is attached to the mounting panel by the lock leg of the buckle portion, the distance from the top face of the mounting panel to the bundled wire harness becomes small, thereby reducing the space for mounting the wire harness, and further it is possible to prevent backlash of the wire harness in the belt clamp and to suppress noise or abnormal sounds due to the backlash.

What is claimed is:

1. A belt clamp comprising a buckle portion having a base plate and an upper plate spaced from and connected to said base plate by a pair of spaced apart side plates to define a thorough hole, said base plate having a pair of spaced slits in one end thereof defining a tongue having at least one pawl thereon projecting into said hole and a belt portion secured at one end to said buckle portion and having a plurality of cogs adjacent an opposite end for cooperation with said at least one pawl upon insertion of said opposite end of said belt portion into said hole.

* * * * *